June 21, 1960
W. S. SCHAEFFER
2,941,345
MOWING MACHINE
Filed June 7, 1957
2 Sheets-Sheet 1
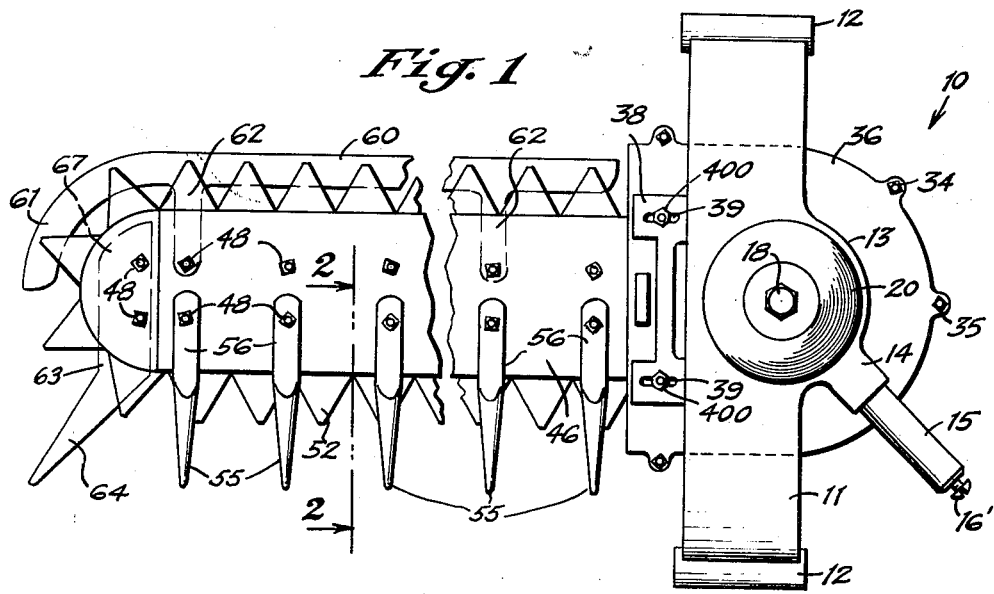
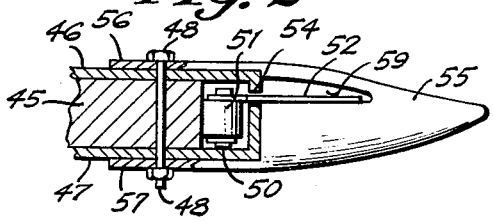
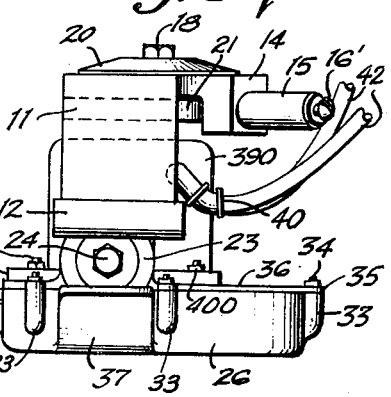
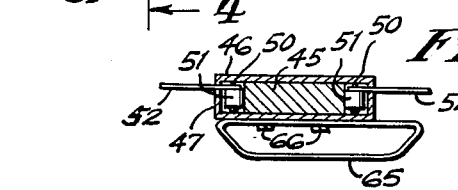
INVENTOR.
WILLIAM S. SCHAEFFER
BY
Patrick D Beavers
ATTORNEY

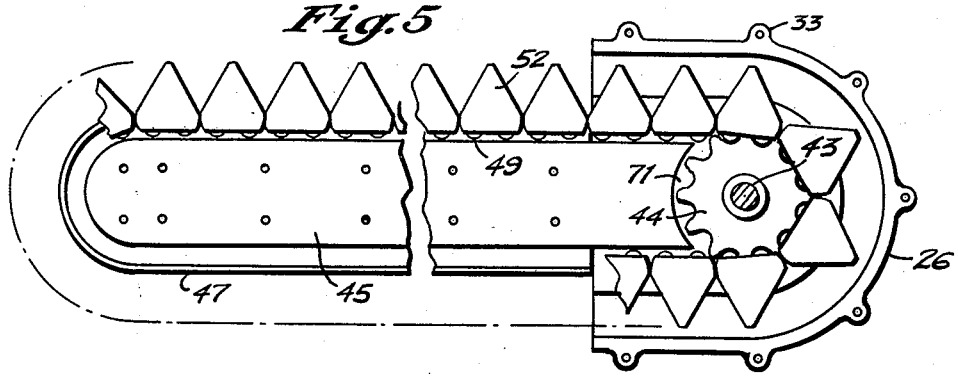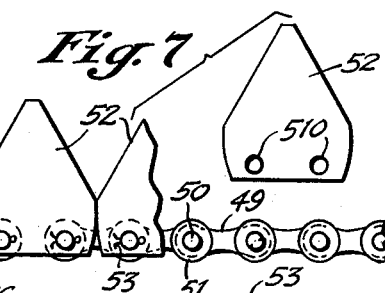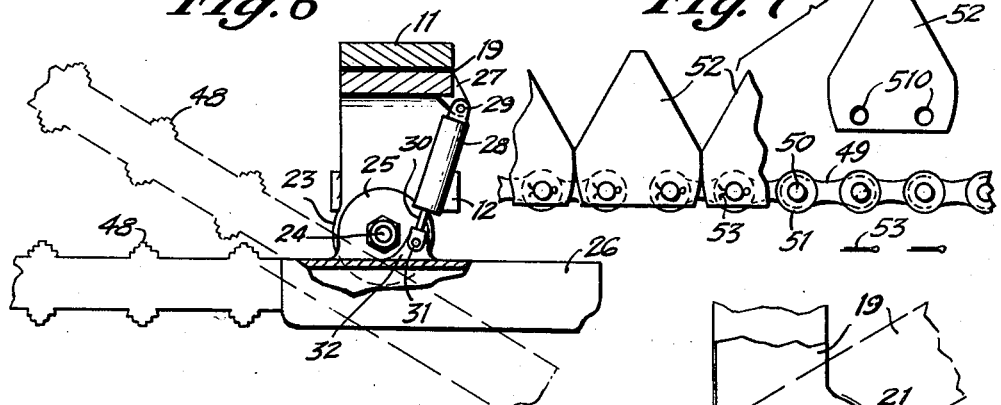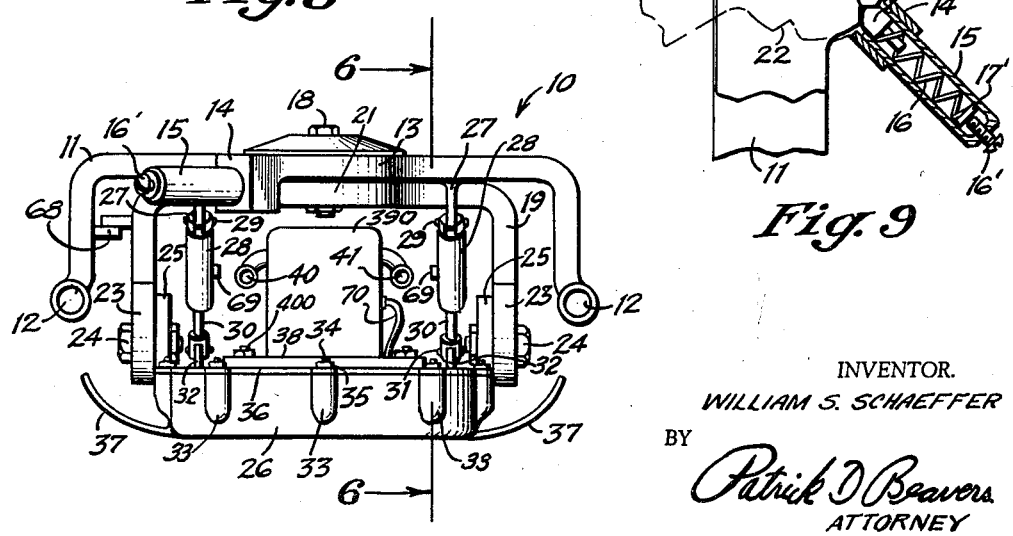
INVENTOR.
WILLIAM S. SCHAEFFER
BY
Patrick D Beavers
ATTORNEY

2,941,345

MOWING MACHINE

William S. Schaeffer, South Webster, Ohio

Filed June 7, 1957, Ser. No. 664,336

1 Claim. (Cl. 56—25)

This invention relates to improvements in mowing machines.

An object of this invention is to provide a mowing machine that is adapted to be attached to a tractor at the right, left, front or rear thereof as desired.

Another object of the invention is to provide a mowing machine that is provided with an endless cutting chain that is operated by a hydraulic motor.

A further object of the invention is to provide a mowing machine that is raised or lowered by hydraulic rams.

A still further object of the invention is to provide a lubricating system for the mowing machine that will prevent wear from lack of proper lubrication.

With the above and other objects and advantages in view, the invention consists of the novel details of construction, arrangement and combination of parts more fully hereinafter described, claimed and illustrated in the accompanying drawings in which:

Fig. 1 is a top plan view, partly broken away, of a mowing machine embodying the invention with a guard member for the mowing machine being shown;

Fig. 2 is an enlarged sectional view on the line 2—2 of Fig. 1;

Fig. 3 is a side elevational view, partly broken away, of the mowing machine of Fig. 1;

Fig. 4 is a sectional view on the line 4—4 of Fig. 3;

Fig. 5 is a top plan view, partly broken away, with parts removed to show the endless cutting chain;

Fig. 6 is a fragmentary detailed sectional view on the line 6—6 of Fig. 8 and including a housing for the cutter bar;

Fig. 7 is an enlarged detailed fragmentary top plan view, partly disassembled, of the endless cutting chain, showing the manner of mounting a cutter on the chain.

Fig. 8 is an end view of the mowing machine; and

Fig. 9 is a detailed sectional view of a locking bar for the mowing machine with dotted lines indicating the movement of a frame member and its associated bracket.

Referring more in detail to the drawings, wherein like parts are designated by like reference numerals, the reference numeral 10 is used to generally designate a mowing machine embodying the invention.

The mowing machine 10 comprises a main U-shaped frame 11 that is provided with tubular mounting bushings 12 at the opposite ends thereof for mounting the mowing machine 10 on a tractor. A semi-circular enlargement 13 is provided on the edge of the frame 11 centrally thereof and a hollow L-shaped projection 14 extends outwardly of the enlargement 13 at an approximated 45 degree angle. A tubular spring housing 15 is inserted into the projection 14 and a spring 16 in the housing 15 urges a locking dog 17 inwardly of the housing 15 for a purpose to be later described. A spring pressure adjusting screw 16' is threadably mounted in the outer end of the spring housing 15 and the inner end of the screw 16' engages a disc 17' that is mounted in the spring housing 15 in engagement with the end of the spring 16. The screw 16' may be adjusted to increase or decrease the pressure of the spring 16 on the dog 17.

Connected to the frame 11 by a bolt 18 is a U-shaped mounting bracket 19 and a circular cap 20 is positioned on the frame 11 under the head of the bolt 18. The bracket 19 is also provided with a semi-circular enlargement 21 that is positioned below the enlargement 13 on the frame 11 parallel therewith and the edge of the enlargement 21 is provided with a notch 22 that is adapted to be engaged by the dog 17.

A circular bearing 23 is provided on each end of the bracket 19 and a pivot bolt 24 is mounted in the bearing 23 to receive the bearings 25 on a cutting bar housing 26.

An apertured lug 27 extends rearwardly of the edge of the bracket 19 on each side of the enlargement 21 and a cylinder 28 of a hydraulic ram is pivotally connected at 29 to each of the lugs 27. A piston 30 for the ram is pivotally connected at 31 to an apertured lug 32 on the housing 26, as shown in Fig. 6.

The housing 26 has bolt receiving projections 33 positioned on the edge thereof in relatively spaced relation to each other to receive bolts 34 that pass through bolt receiving ears 35 on a top plate 36. The housing 26 is also provided with drag shoes 37 that extend outwardly thereof at opposite sides thereof.

A motor mounting plate 38 for a hydraulic motor 390 is positioned on the top plate 36. The motor mounting plate 38 is provided with parallel slots 39 to receive bolts 400 that are mounted in the top plate 36. The slots 39 permit the mounting plate 38 to slide on the top plate 36 as will be later described. The motor 390 has connections 40 and 41, respectively, for oil supply and exhaust lines 42, as shown in Fig. 3.

The motor 390 has a drive shaft 43 that extends into the housing 26 and a sprocket 44 is mounted on the shaft 43 within the housing 26. A cutter bar 45 extends outwardly of the housing 26 and upper and lower track members 46 and 47 are secured to the cutter bar 45 in spaced relation to each other by means of bolts 48. An endless cutting chain 49 extends over the sprocket 44 and through the track members 46 and 47. The links of the chain 49 are connected by pins 50 on which are mounted rollers 51. Cutters 52 are mounted on the pins 50 by means of a pair of spaced openings 510 and cotter keys 53 retain the cutters 52 on the pins 50, as shown in Fig. 7. The cutters 52 extend between the space 54 between the edges of the track members 46 and 47.

Guards 55 have upper and lower attaching portions 56 and 57 that are attached to the cutter bar 45 by the same bolts 48 that connect the track members 46 and 47 to the cutter bar 45. The guards 55 have a cavity 59 therein through which the cutters 52 pass as the chain 49 rotates.

A rear guard 60 extends the full length of the cutter bar 45 and has a curved forward end 61 that partly covers the outer end of the cutter bar 45. Extensions 62 mount the rear guard 60 on the cutter bar 45 by means of the bolts 48. The extensions 62 space the rear guard from the cutter bar 45 so that the points of the cutters 52 terminate within the outer edge of the guard 60, as shown in Fig. 1.

An L-shaped end guard 63 is secured to the outer end of the cutter bar 45 by bolts 48 and the guard has a pointed portion 64 that extends at an angle from the cutter bar 45 and terminates at a line passing through the outer ends of the guards 55. A removable semi-circular plate 67 is positioned over the end guard 63 so that the guard 63 or cutters 52 may be removed and replaced as desired, as shown in Fig. 1.

A drag shoe 65 is secured to the outer end of the cutter bar 45 by bolts 66, as shown in Fig. 4.

Locking means 68 are provided on the frame 11 and bracket 19 to relieve strain on the bolt 18, as shown in Fig. 8. The locking means 68 shown in Fig. 8 comprises a pair of superposed projections through which a locking pin may be inserted, other forms of locking means being employed as desired.

When the mowing machine is to be attached to a tractor, mounting arms on the tractor, not shown, are connected to the bushings 12. Lines 42 are connected to a suitable supply of fluid for the operation of the motor 390 and suitable fluid supply lines are connected at 69 for the operation of the rams 28. A fluid supply line 70 feeds excess oil from the motor 390 to the sump 71 around the sprocket 44 and oil from the sump 71 travels through the lower track member 47 so that the chain 49 and cutters 52 run in a bath of oil at all times.

The rams 28 raise and lower the cutter bar assembly 45, as shown in Fig. 6, and the dog 17, engaging with the notch 22, retains the cutter bar assembly 45 at right angles to the tractor. However, should the cutter bar strike a hard unresisting object the dog 17 will be disengaged from the notch 22 and the cutter bar assembly will swing, as in Fig. 9, to prevent damage to the cutter bar assembly.

The guard 60 prevents the cuttings from falling back on the cutters as the cutting chain rotates.

The plate 38 is adjustable to tighten the chain 49 and the only connection from the motor 390 is by direct connection of the sprocket 44.

There has thus been provided a mowing machine that may be made in various lengths to cut swathes of various widths. A mowing machine that is simple in construction, efficient in operation and is fully lubricated at all times.

It is believed that from the foregoing description the structure and operation of the mowing machine will be apparent to those skilled in the art and it is to be understood that changes in the minor details of construction, arrangement and combination of parts may be resorted to provided they fall within the spirit of the invention and the scope of the appended claim.

Having thus described the invention what is claimed as new and desired to be secured by Letters Patent is:

A mowing machine comprising a main U-shaped frame having means thereon for connecting said frame to a tractor, a U-shaped bracket positioned within said main frame and pivotally connected to said main frame, a housing pivotally connected to said bracket, a cutter bar in said housing, an endless cutting chain circumjacent to said cutter bar, removable cutters on said cutting chain, a motor mounted on said housing and having direct connection with said chain for the rotation thereof, means connected to said housing and said bracket for raising and lowering said cutter bar and housing, drag shoes mounted on said housing and on said cutter bar, cutter guards for said cutters connected to said cutter bar, said frame having a dog on one edge thereof, and said bracket has a notch therein for normally receiving said dog, whereby said bracket and its associated elements may be moved rearwardly with respect to the tractor when said cutter bar encounters a greater than predetermined resistance.

References Cited in the file of this patent

UNITED STATES PATENTS

| | | |
|---|---|---|
| 1,958,405 | Anthony et al. | May 15, 1934 |
| 2,482,249 | Court | Sept. 20, 1949 |
| 2,624,999 | Goodnight | Jan. 13, 1953 |
| 2,793,487 | Wobermin | May 28, 1957 |